United States Patent
Miller et al.

(10) Patent No.: US 6,375,142 B1
(45) Date of Patent: Apr. 23, 2002

(54) SPEAKER FRAME HOUSING AND CLAMP ASSEMBLY FOR WALL OR CEILING MOUNTS AND METHOD

(75) Inventors: Brian H. Miller; Khaven Neak; Kenneth B. Hecht, all of Jacksonville, FL (US)

(73) Assignee: United Speaker Systems, Inc., Jacksonville, FL (US)

( * ) Notice: Subject to any disclaimer, the term of this patent is extended or adjusted under 35 U.S.C. 154(b) by 15 days.

(21) Appl. No.: 09/655,909

(22) Filed: Sep. 5, 2000

(51) Int. Cl.[7] .................................................. A47G 1/10
(52) U.S. Cl. ....................... 248/316.1; 52/217; 52/220.8
(58) Field of Search .............................. 52/212, 204.54, 52/204.56, 208, 217, 220.8; 248/316.1, 906, 205.1, 224.1

(56) References Cited

U.S. PATENT DOCUMENTS

| | | | | |
|---|---|---|---|---|
| 3,566,565 A | * | 3/1971 | Pond ............................ | 52/208 |
| 4,280,309 A | * | 7/1981 | Huelsekopf .................. | 52/212 |
| 4,407,100 A | * | 10/1983 | Huelsekopf .................. | 52/212 |
| 4,920,718 A | * | 5/1990 | Artwick et al. ............... | 52/748 |
| 5,369,922 A | * | 12/1994 | Hansen ..................... | 52/204.54 |
| 5,644,881 A | * | 7/1997 | Neilly .......................... | 52/455 |
| 5,749,184 A | * | 5/1998 | McKann ..................... | 52/204.1 |

* cited by examiner

Primary Examiner—Leslie A. Braun
Assistant Examiner—Kofi Schulterbrandt
(74) Attorney, Agent, or Firm—Arthur G. Yeager

(57) ABSTRACT

A mounting assembly for mounting a fixture in an opening in a wall that defines a recess includes a unitary frame housing having a first and second pair of oppositely disposed and spaced side members connected at right angles to define an open interior space. A pair of clamps are provided for engaging the rear surface of a wall and are pivotally connected to a respective first side member by a combination of holes in the clamp, side member and bolts. The hole in the respective side member is larger than the diameter of the bolt to allow the clamps to be pivoted inwardly of the wall opening. When the bolts are tightened, the clamps are moved outwardly and pulled toward the rear surface of the wall to sandwich the wall between a clamp and a first side member. The clamps are self aligning with the flange as they are being tightened together.

10 Claims, 4 Drawing Sheets

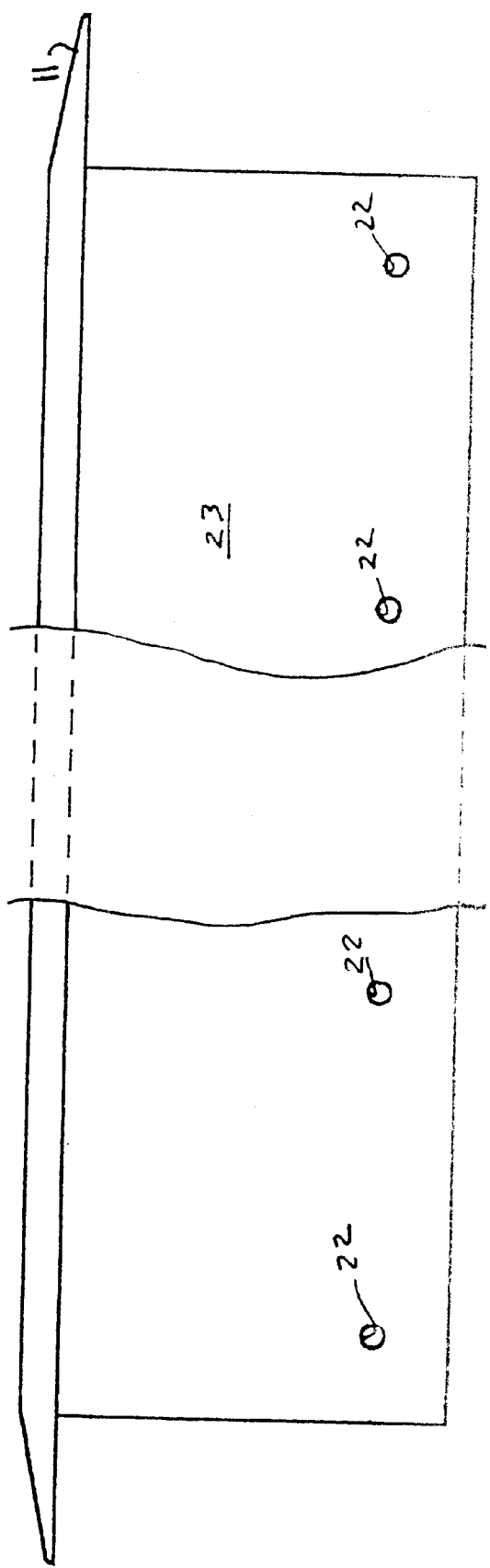

SPEAKER FRAME HOUSING AND CLAMP ASSEMBLY FOR WALL OR CEILING MOUNTS AND METHOD

CROSS REFERENCE TO RELATED APPLICATIONS

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Field of the Invention

The present invention relates to mounting brackets and particularly to mounting brackets for mounting a fixture in the recess of a structural wall.

2. Description of the Related Art

It is common practice to mount audio speakers, exhaust fans, and air conditioning duct work in a wall recess. A wide variety of frames and housings have been developed that require large openings and various hooks and bolt/nut combinations that are awkward and do not mount the installed device securely. These include apparatus wherein the rear frame is the same size as the front frame and must be meticulously fitted through the wall opening. It is quite cumbersome to install because of the difficulty in holding the rear frame in place and properly aligned while installing the screws or bolts. What is desired is a mounting assembly that requires the minimum opening to be made in a wall or ceiling and can securely mount heavy items such as large audio speakers.

BRIEF SUMMARY OF THE INVENTION

In one aspect of the present invention there is provided a mounting assembly for mounting a fixture in an opening in a wall defining a recess comprising an integral frame housing having a first pair of oppositely disposed and spaced side members and a second pair of oppositely disposed and spaced side members, the pairs of side members defining an open interior space adapted to accommodate a fixture, a pair of clamps for engaging a rear surface of a wall adjacent an opening defining a recess in a wall, fastening means for movably mounting each clamp to a respective side member of the first pair of side members, the fastening means including at least one hole through each respective side member of the first pair of side members. There is at least one hole through each of the clamps. An elongated bolt means is inserted through the holes to secure one clamp to a respective side member of the first pair of side members and at least one hole in a side member being generally larger than a diameter of a bolt to allow inward movement of the bolt to dispose respective clamp temporarily interiorly of an outermost extension of the frame housing adapted to closely fit within a recess of a wall. The frame housing has an outer laterally extending flange border completely covering a recess of a wall, and the bolt means is tightened to move the pair of clamps laterally outwardly to secure respective first pair of side members to a front surface of a wall adjacent a recess in a wall and to secure respective clamp to a rear surface of a wall adjacent a recess in a wall. When the bolt means is fully tightened it will sandwich a wall adjacent a recess between the pair of clamps and the flange. In other aspects each of the first pair of side members includes an inner flange extending inwardly into the interior space and a respective clamp is mounted to the inner flange. The flange border includes a pair of outer flanges extending generally coextensive with the clamps. The clamps self align with the frame when the frame and clamps are tightened together with the bolts.

Each of the first pair of side members includes a wall member having an upper portion and a lower portion and an outer flange extending outwardly from the top portion of the wall member for engaging a front surface of a recess in a wall and an inner flange extending inwardly into the interior space from the lower portion of the wall member, the pair of clamps being pivotally mounted to respective inner flange. Each clamp has an outer flange for engaging a rear surface of a wall and an inner flange extending inwardly, the holes for pivotally mounting a clamp to respective side member being formed in the inner flange.

Further aspects of the invention include a mounting assembly for mounting a fixture in an opening in a wall defining a recess comprising an integral frame housing having a first pair of oppositely disposed and spaced side members and a second pair of oppositely disposed and spaced side members, the pairs of side members defining an open interior space adapted to accommodate a fixture. The first pair of side members each includes a wall member having an upper portion and a lower portion and an outer flange extending outwardly from the top portion of the wall member for engaging the front surface of a wall and an inner flange extending inwardly into the interior space from the lower portion of the wall member. A pair of clamps is provided for engaging a rear surface of a wall and fastening means for movably mounting each clamp to a respective side member of the first pair of side members. The fastening means includes at least one hole through each inner flange and at least one hole through each clamp. A bolt means is inserted through each hole to secure each clamp to a respective side member of the first pair, at least one hole in the inner flange being generally larger than the diameter of the bolt to allow inward movement of the bolt to dispose respective clamp temporarily interiorly of the outermost extension of a wall member of respective side member. The bolt means is tightened to move the pair of clamps laterally outwardly to secure respective clamp to the rear surface of a wall adjacent a recess in a wall. The bolt means when fully tightened will sandwich a wall adjacent a recess between the pair of clamps and the flange. Each clamp has an outer flange for engaging the rear surface of a wall and an inner flange extending inwardly, the holes for pivotally mounting a clamp to respective side member being formed in the inner flange. Each respective wall member of each first pair of side members has at least one hole formed therethrough for securing a side member to a stud member adjacent a rear surface of a wall.

In another aspect of the present invention there is provided a mounting assembly for mounting a fixture in an opening in a wall defining a recess comprising a unitary frame housing having a first pair of oppositely disposed and spaced side members and a second pair of oppositely disposed and spaced side members, each of the second pair being attached at right angles to one of the first pair, the pairs of side members thereby defining an open interior space adapted to accommodate a fixture. One of the first pair of side members and one of the second pair of side members each includes an outer flange extending outwardly of the interior space for engaging the front surface of a wall and an inner flange extending inwardly into the interior space. A pair of clamps is provided for engaging the rear surface of a wall and fastening means is provided for pivotally mounting each clamp to a respective side member of the first pair of side members. The fastening means includes at least one hole through each inner flange. There is at least one hole through each clamp and a bolt means is inserted through each hole to secure each clamp to a respective side member of the first pair. At least one hole in the inner flange is generally larger than the diameter of the bolt to dispose respective clamp temporarily interiorly of an opening in a wall, the bolts being tightened to secure respective outer flange to the surface of a wall adjacent a recess opening in a wall and to secure respective outer flange to the surface of a wall adjacent a recess opening in a wall and to secure respective clamp to a rear surface of a wall adjacent a recess opening in a wall.

Other aspects of the invention include a method of mounting a fixture in an opening in a wall defining a recess comprising the steps of: mounting a frame having an outwardly extending border flange into the recess to position the flange against an outer surface of the wall adjacent the opening; movably mounting clamps for engaging a rear surface of the wall adjacent the opening to the frame in a manner to allow for temporarily moving the clamps interiorly of the outermost extension of the opening; moving the clamps outwardly after the frame and the clamps have been mounted in the recess; and moving the clamps against a rear surface of the wall adjacent the opening to sandwich the wall adjacent the opening between the clamps and the flange.

BRIEF DESCRIPTION OF THE SEVERAL VIEWS OF THE DRAWING

The novel features which are believed to be characteristic of this invention are set forth with particularity in the appended claims. The invention itself, however, both as to its organization and method of operation, together with further objects and advantages thereof, may best be understood by reference to the following description, taken in connection with the accompanying drawing in which:

FIG. 4 is a side elevational view of the frame housing of FIG. 1.

DETAILED DESCRIPTION OF THE INVENTION

Figure 1:
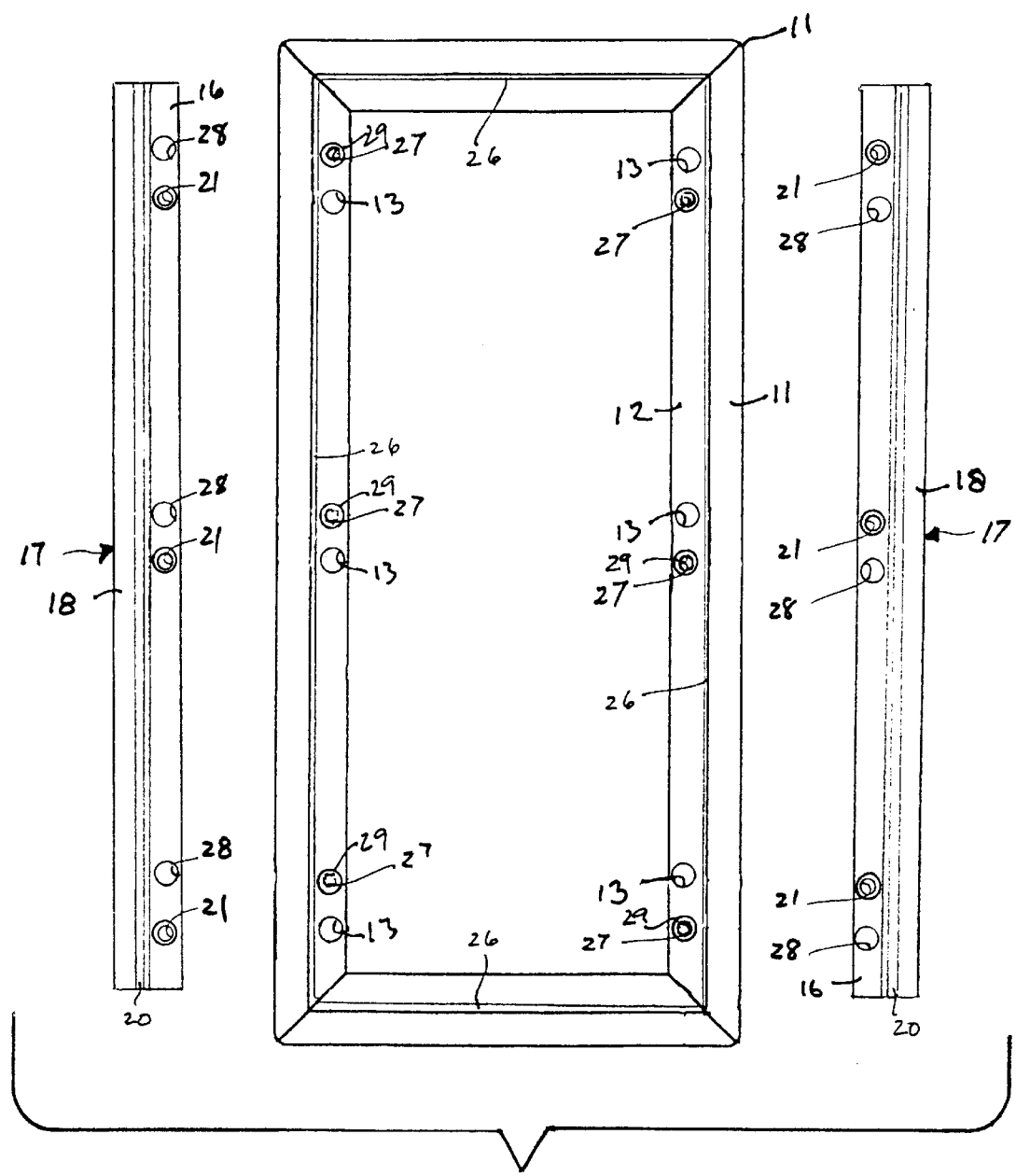
FIG. 1 is a top plan view of the fame housing and two clamps in accord with the present invention.
Figure 2:
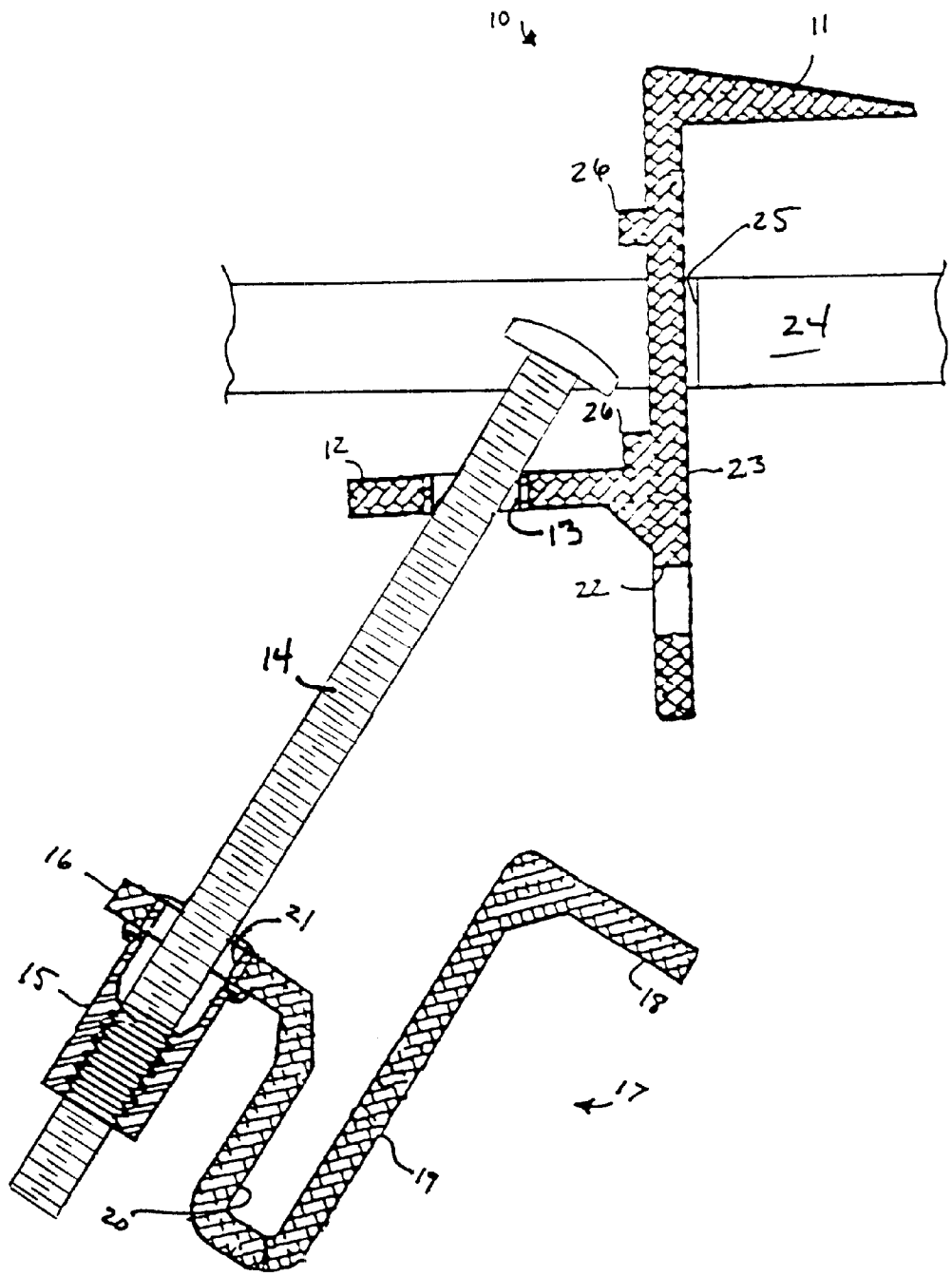
FIG. 2 is a pictorial cross-sectional view of a clamp member connected by bolts as shown in FIG. 1, pivoted inwardly during installation of the frame housing.

With reference to the drawings, the frame housing and two clamps are shown in FIGS. 1 and 2. The frame housing 10 includes a generally rectangular outwardly extending planar outer flange 11 and an inwardly extending planar inner flange 12 and planar wall 23 defining an open interior space. Six spaced holes formed in flange 12 receive six threaded bolts 14, which are also threaded through three holes 21 in inwardly extending flange 16 of clamp 17. Nut inserts 15 are installed in holes 21.

Before bolts 14 are tightened, clamp 17 is pivoted inwardly as shown in FIG. 2 to place the outer edge of outwardly extending flange 18 in line with the wall 23 of frame housing 10 and thus inside the opening 25 cut into wall 24 or other structure. Because holes 13 in flange 12 are of greater diameter than bolts 14 the clamps 17 can be pivoted inwardly as shown.

Figure 3:
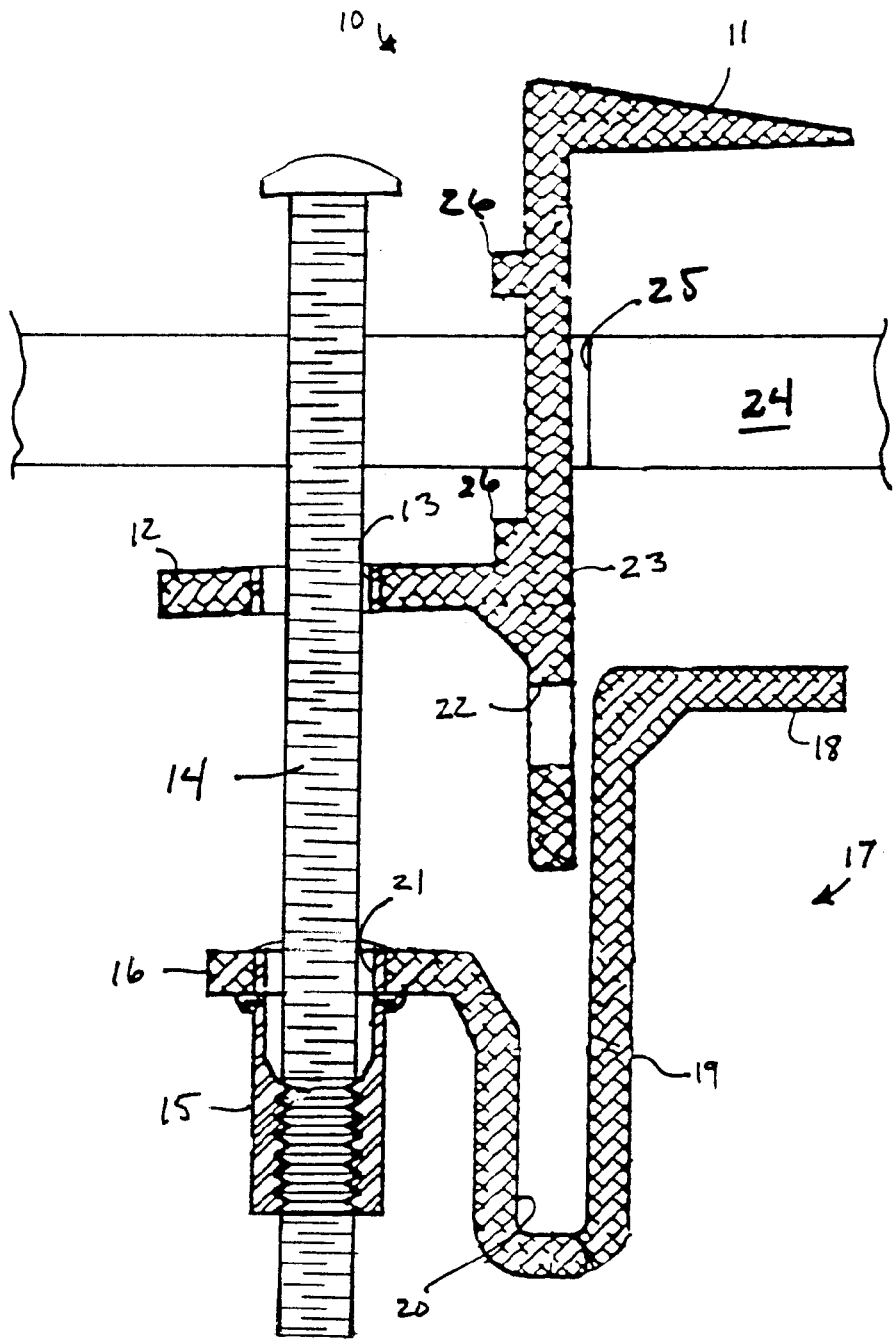
FIG. 3 is a pictorial cross-sectional view of the clamp member of FIG. 2 pivoted outwardly for sandwiching a section of wall between the frame housing and the clamp.

Once the frame housing 10 and the clamps 17 are installed through opening 25 the clamps can be moved outwardly to the position shown in FIG. 3. As bolts 14 are tightened flange 11 will be forced against the outer surface of wall 24 and clamps 17 will be pulled inwardly toward the wall 24 placing flange 18 against the inside of wall 24. When the bolts 14 are tightened into the final position wall 24 is sandwiched between flanges 11 and 18 and the larger diameter holes 13 do not at that position allow any "play" or pivotal movement of clamps 17 and accordingly the clamps 17 are self aligning with the flange 11. Bosses 26 may be provided for use in securing speakers, fans or other devices into the frame housing 10. The additional holes 27 and 28 also provide means for securing devices to housing 10 and clamps 17. Preferably holes 27 include nut inserts 29 (FIG. 1) to improve alignment of the article mounted.

In the event opening 25 is adjacent a wall stud, holes 22 in housing 10 provide a method whereby bolts, screws, or nails can be used to secure a side of housing 10 to the wall stud behind opening 25 and thus eliminate the need for the associated clamp 17.

As illustrated, the mounting is rectangular in form with two clamps 17 pivotally mounted to the long sides. It is to be understood that clamps 17 can be mounted to the short sides and in addition, one clamp 17 could be mounted to a long side and another clamp 17 to a short side. These alternative embodiments are used where appropriate depending upon the size and weight of the installed apparatus.

While the invention has been described with respect to certain specific embodiments, it will be appreciated that many modifications and changes may be made by those skilled in the art without departing from the spirit of the invention. It is intended, therefore, by the appended claims to cover all such modifications and changes as fall within the true spirit and scope of the invention.

What is claimed as new and what it is desired to secure by Letters Patent of the United States is:

1. A mounting assembly for mounting a fixture in an opening in a wall defining a recess comprising an integral frame housing having a first pair of oppositely disposed and spaced side members and a second pair of oppositely disposed and spaced side members, said pairs of side members defining an open interior space adapted to accommodate a fixture, a pair of clamps for engaging a rear surface of a wall adjacent an opening defining a recess in a wall, fastening means for movably mounting each said clamp to a respective said side member of said first pair of side members, said fastening means including at least one hole through each said respective side member of said first pair of side members and at least one hole through each of said clamps and an elongated bolt means inserted through said holes to secure one said clamp to a respective said side member of said first pair of side members, said at least one hole in said side member being generally larger than a diameter of said bolt means to allow inward movement of said bolt means to dispose respective said clamp temporarily interiorly of an outermost extension of said frame housing adapted to closely fit within a recess of a wall, said frame housing having an outer laterally extending flange border completely covering a recess of a wall, said bolt means being tightened to move said pair of clamps laterally outwardly to secure respective said first pair of side members to a front surface of a wall adjacent a recess in a wall and to secure respective said clamp to a rear surface of a wall adjacent a recess in a wall, said bolt means while being tightened causing said clamp means to be self aligned with said flange border and when fully tightened sandwiching a wall adjacent a recess between said pair of clamps and said flange border.

2. The mounting assembly as defined in claim 1 wherein each of said first pair of side members includes an inner flange extending inwardly into said interior space, a respective said clamp being mounted to said inner flange.

3. The mounting assembly as defined in claim 2 wherein said flange border includes a pair of outer flanges extending generally coextensive with said clamps.

4. The mounting assembly as defined in claim 1 wherein each of said first pair of side members includes a wall member having an upper portion and a lower portion and an outer flange extending outwardly from said top portion of said wall member for engaging a front surface of a recess in a wall and an inner flange extending inwardly into said interior space from said lower portion of said wall member, said pair of clamps being pivotally mounting each said clamp to respective said inner flange of said side members.

5. The mounting assembly as defined in claim 1 wherein each said clamp has an outer flange for engaging a rear surface of a wall and an inner flange extending inwardly, said holes for pivotally mounting a said clamp to respective said side member being formed in said inner flange of said side members.

6. A mounting assembly for mounting a fixture in an opening in a wall defining a recess comprising a integral frame housing having a first pair of oppositely disposed and spaced side members and a second pair of oppositely disposed and spaced side members, said pairs of side members defining an open interior space adapted to accommodate a fixture, said first pair of side members each including a wall member having an upper portion and a lower portion and an outer flange extending outwardly from said top portion of said wall member for engaging the front surface of a wall and an inner flange extending inwardly into said interior space from said lower portion of said wall member, a pair of clamps for engaging a rear surface of a wall, fastening means for movably mounting each said clamp to a respective said side member of said first pair of side members, said fastening means including at least one hole through each said inner flange, and at least one hole through each said clamp, and a bolt means inserted through each said hole to secure each said clamp to a respective said side member of said first pair, said at least one hole in said inner flange being generally larger than the diameter of said bolt means to allow inward movement of said bolt means to dispose respective said clamp temporarily interiorly of an outermost extension of a said wall member of respective said side member, each of said bolt means being tightened to move said pair of clamps laterally outwardly to secure respective said outer flange to a surface of a wall adjacent a recess in a wall and to secure respective said clamp to a rear surface of a wall adjacent a recess in a wall, said bolt means when fully tightened sandwiching a wall adjacent a recess between said pair of clamps and said flange.

7. The mounting assembly as defined in claim 6 wherein each said clamp has an outer flange for engaging rear surface of a wall and an inner flange extending inwardly, said holes for mounting respective said clamp to respective said side member being formed in said inner flange of said side member for pivotally mounting said respective clamp.

8. The mounting assembly as defined in claim 6 wherein each respective wall member of each said first pair of side members has at least one hole formed therethrough for securing said side member to a stud member adjacent a rear surface of a wall.

9. A mounting assembly for mounting a fixture in an opening in a wall defining a recess comprising a unitary frame housing having a first pair of oppositely disposed and spaced side members and a second pair of oppositely disposed and spaced side members, each of said second pair being attached at right angles to one of said first pair, said pairs of side members thereby defining an open interior space adapted to accommodate a fixture, one of said first pair of side members and one of said second pair of side members each including an outer flange extending outwardly of said interior space for engaging the front surface of a wall and an inner flange extending inwardly into said interior space, a pair of clamps for engaging the rear surface of a wall, fastening means for pivotally mounting each said clamp to a respective side member of said first pair of side members, said fastening means including at least one hole through each said inner flange the at least one hole through each said clamp, and a bolt means inserted through each said hole to secure each said clamp to a respective said side member of said first pair, said at least one hole in said inner flange being generally larger than the diameter of said bolt means to dispose respective said clamp temporarily interiorly of an opening in a wall, each of both means said being tightened to secure respective said outer flange to a surface of a wall adjacent a recess opening in a wall and to secure respective said clamp to a rear surface of a wall adjacent a recess opening in a wall.

10. A method of mounting a fixture in an opening in a wall defining a recess comprising the steps of:

A. mounting a frame having an outwardly extending border flange into the recess to position the flange against an outer surface of the wall adjacent the opening;

B. movably positioning clamps for engaging a rear surface of the wall adjacent the opening to the frame in a manner to allow for temporarily location the clamps interiorly of the the opening of step A; to permit the clamps to be moved through the opening C. moving the clamps of step B outwardly of the opening after the frame and the clamps have been positioned in the recess; and D. moving the clamps against a rear surface of the wall adjacent the opening to sandwich the wall adjacent the opening between the clamps and the flange.

\* \* \* \* \*